United States Patent
Chakra et al.

(10) Patent No.: US 10,341,813 B2
(45) Date of Patent: *Jul. 2, 2019

(54) ANONYMIZING LOCATION DATA

(71) Applicant: International Business Machines Corporation, Armonk, NY (US)

(72) Inventors: Al Chakra, Apex, NC (US); Liam Harpur, Skerries (IE); Erik H. Katzen, Argyle, TX (US); John Rice, Tramore (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,358

(22) Filed: Jun. 14, 2017

(65) Prior Publication Data

US 2018/0091942 A1 Mar. 29, 2018

Related U.S. Application Data

(63) Continuation of application No. 15/278,060, filed on Sep. 28, 2016.

(51) Int. Cl.
*H04W 12/02* (2009.01)
*H04W 4/02* (2018.01)
(Continued)

(52) U.S. Cl.
CPC .......... *H04W 4/023* (2013.01); *H04W 12/02* (2013.01); *H04W 40/20* (2013.01); *H04M 1/72572* (2013.01)

(58) Field of Classification Search
CPC ......... H04W 12/02; H04W 4/02; H04W 8/16; H04W 12/06; H04L 9/321
See application file for complete search history.

(56) References Cited

U.S. PATENT DOCUMENTS 8,402,117 B2 3/2013 Zellner et al.
8,639,221 B1 1/2014 Zang et al.
(Continued)

OTHER PUBLICATIONS

Tolia et al., Quatifying Interactive User Experience on Thin Clients, Carnegie Mellon Univeristy, Computer Science Department, 2006, 8 pages.
(Continued)

*Primary Examiner* — Julio R Perez
(74) *Attorney, Agent, or Firm* — Michael P. O'Keefe; Hunter E. Webb; Keohane & D'Alessandro PLLC

(57) ABSTRACT

Approaches presented herein enable servicing a location request for a user device by providing anonymized location data. Specifically, a location request for a user device is received from an application server associated with a location-based/location-tracking application. Based on an application setting option associated with the location-based/location-tracking application, a geographic cell is defined. A set of available participating devices within the geographic cell is identified. A participating device is selected from the set of available participating devices. The location request is routed to the selected participating device, wherein the selected participating device forwards a location of the selected participating device to the application server.

20 Claims, 8 Drawing Sheets

(51) Int. Cl.
*H04W 40/20* (2009.01)
*H04M 1/725* (2006.01)

(56) References Cited

U.S. PATENT DOCUMENTS

| | | | |
|---|---|---|---|
| 8,655,389 | B1 | 2/2014 | Jackson et al. |
| 8,726,398 | B1 | 5/2014 | Tock et al. |
| 8,738,602 | B1 | 5/2014 | Lewis |
| 8,972,605 | B2 | 3/2015 | Fletcher et al. |
| 9,319,876 | B2 * | 4/2016 | Arunkumar ........... H04W 12/02 |
| 2004/0088349 | A1 | 5/2004 | Beck et al. |
| 2005/0120073 | A1 | 6/2005 | Cho |
| 2014/0089049 | A1 | 3/2014 | Cristofaro |
| 2015/0250891 | A1 | 9/2015 | Venkatraman et al. |
| 2015/0350891 | A1 | 12/2015 | Arunkumar et al. |

OTHER PUBLICATIONS

Castiglione et al., "Forensically-Sound Methods to Collect Live Network Evidence", 2013 IEEE 27th International Conference on Advanced Information Networking and Applications, 2013, 8 pages.

Dingledine et al., "Tor: The Second-Generation Onion Router", SSYM'04 Proceedings of the 13th conference on USENIX Security Symposium—vol. 13, 2004, 18 pages.

Sengupta, Privacy Fears Grow as cities Increase Surveillance, The New York Times, Oct. 14, 2013, 5 pages.

Truong, "This Popular Flashlight App Has Been Secretly Sharing Your Location and Device ID", Dec. 5, 2013, 3 pages.

Basso, "Advantages and Disadvantages in a Location-Aware Society", Jul. 25, 2002, https://www.gartner.com/doc/365155/advantages-disadvantages-locationaware-society, 4 pages.

Robinson, "Website tracking tags raise privacy fears: Third parties set majority of trackers rather than site publisher", Feb. 25, 2013, 2 pages.

Perez, U.S. Appl. No. 15/278,060, Office Action, dated Dec. 1, 2016, 20 pgs.

Perez, U.S. Appl. No. 15/278,060, Notice of Allowance, dated May 3, 2017, 20 pgs.

* cited by examiner

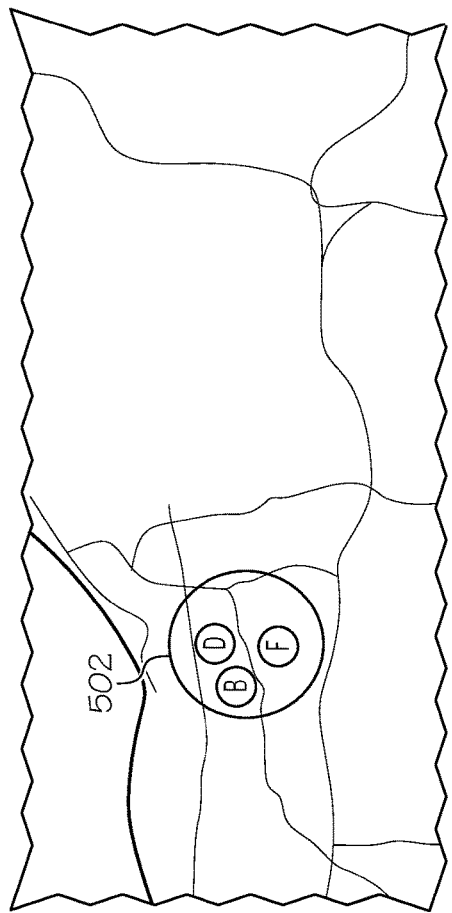
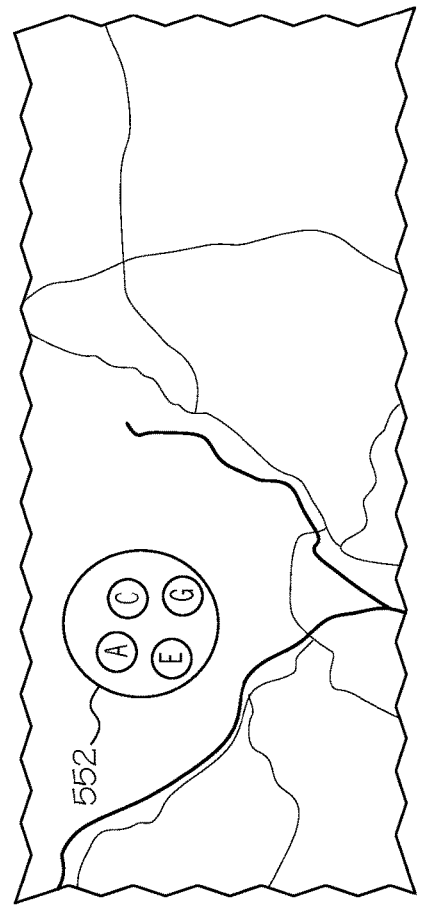

US 10,341,813 B2

ANONYMIZING LOCATION DATA

RELATED U.S. APPLICATION DATA

The present patent document is a continuation of U.S. patent application Ser. No. 15/278,060, filed Sep. 28, 2016, entitled "ANONYMIZING LOCATION DATA", the disclosure of which is incorporated herein by reference.

TECHNICAL FIELD

This invention relates generally to providing location information and, more specifically, to servicing a location request for a user device by providing anonymized location data.

BACKGROUND

As children playing the game 'hide and seek', there often seemed to be so many places where a person could hide and not be discovered. With today's world feeling increasingly smaller through technology, hiding now can seem difficult. Cameras can peer down on us at red lights, when we are walking along city streets, in our workplace, and in stores. Today, those cameras are increasingly being augmented by new technologies that track our cars, cell phones, and possibly even the products that we buy. Such technology means that marketers and others could know a person's whereabouts at any time.

SUMMARY

In general, embodiments of the present invention provide for servicing a location request for a user device by providing anonymized location data. Specifically, a location request for a user device is received from an application server associated with a location-based/location-tracking application. Based on an application setting option associated with the location-based/location-tracking application, a geographic cell is defined. A set of available participating devices within the geographic cell are identified. A participating device is selected from the set of available participating devices. The location request is routed to the selected participating device, wherein the selected participating device forwards a location of the selected participating device to the application server.

One aspect of the present invention includes a computer-implemented method for providing location information, the method comprising: receiving, by a user device from an application server, a request for a location of the user device; defining a geographic cell based on an application option setting associated with an application, wherein the application is associated with the application server; identifying a set of available participating devices within the geographic cell; selecting a participating device from among the set of available participating devices; and routing the location request to the selected participating device via an address associated with the selected participating device.

Another aspect of the present invention includes a computer program product for providing location information, and program instructions stored on the computer readable storage device, to: receive, by a user device from an application server, a request for a location of the user device; define a geographic cell based on an application option setting associated with an application, wherein the application is associated with the application server; identify a set of available participating devices within the geographic cell; select a participating device from among the set of available participating devices; and route the location request to the selected participating device via an address associated with the selected participating device.

Yet another aspect of the present invention includes a computer system for providing location information, the computer system comprising: a memory medium comprising program instructions; a bus coupled to the memory medium; and a processor for executing the program instructions, the instructions causing the system to: receive, by a user device from an application server, a request for a location of the user device; define a geographic cell based on an application option setting associated with an application, wherein the application is associated with the application server; identify a set of available participating devices within the geographic cell; select a participating device from among the set of available participating devices; and route the location request to the selected participating device via an address associated with the selected participating device.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 7A shows an example map 500 according to illustrative embodiments;

FIG. 7B shows an example map 550 according to illustrative embodiments;

Figure 1:
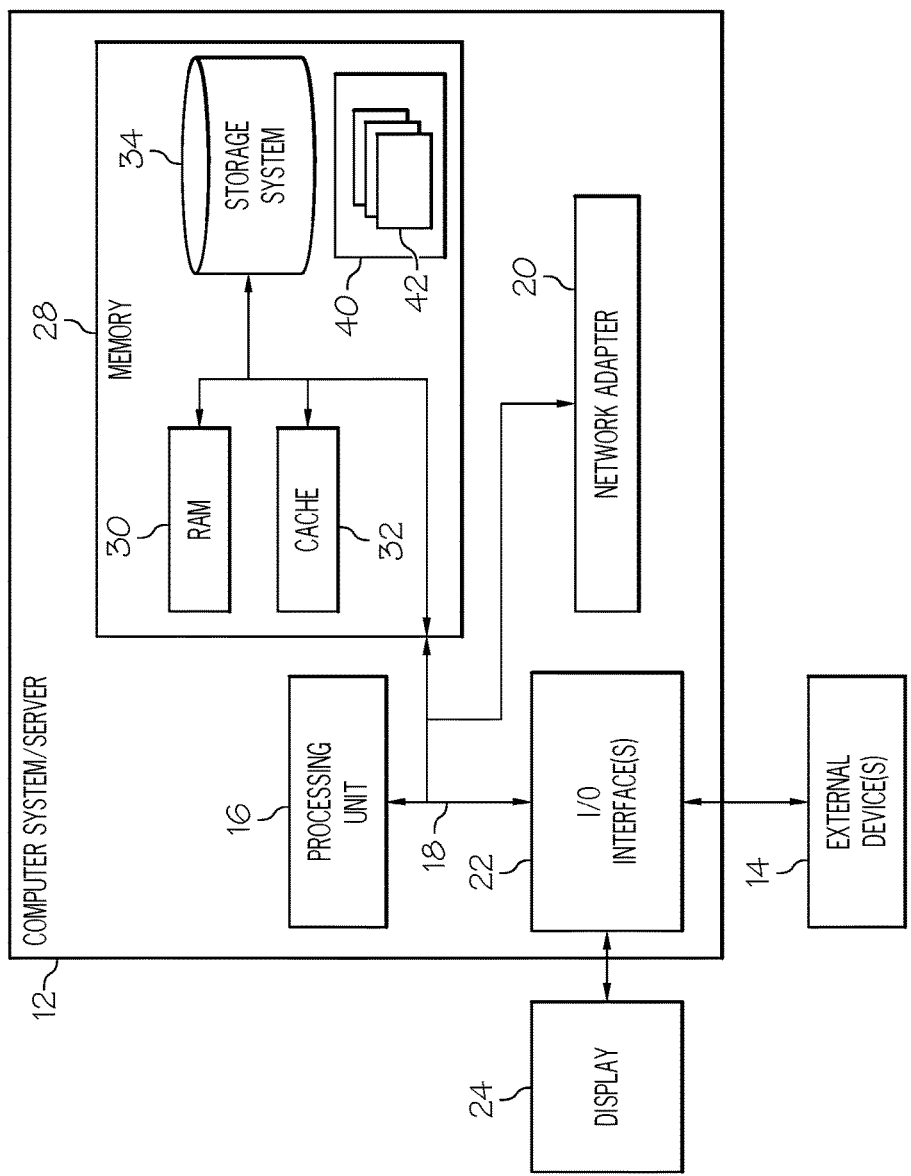
FIG. 1 shows an architecture 10 in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

As stated above, embodiments of the present invention provide for servicing a location request for a user device by providing anonymized location data. Specifically, a location request for a user device is received from an application server associated with a location-based/location-tracking application. Based on an application setting option associated with the location-based/location-tracking application, a geographic cell is defined. A set of available participating devices within the geographic cell is identified. A participating device is selected from the set of available participating devices. The location request is routed to the selected participating device, wherein the selected participating device forwards a location of the selected participating device to the application server.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
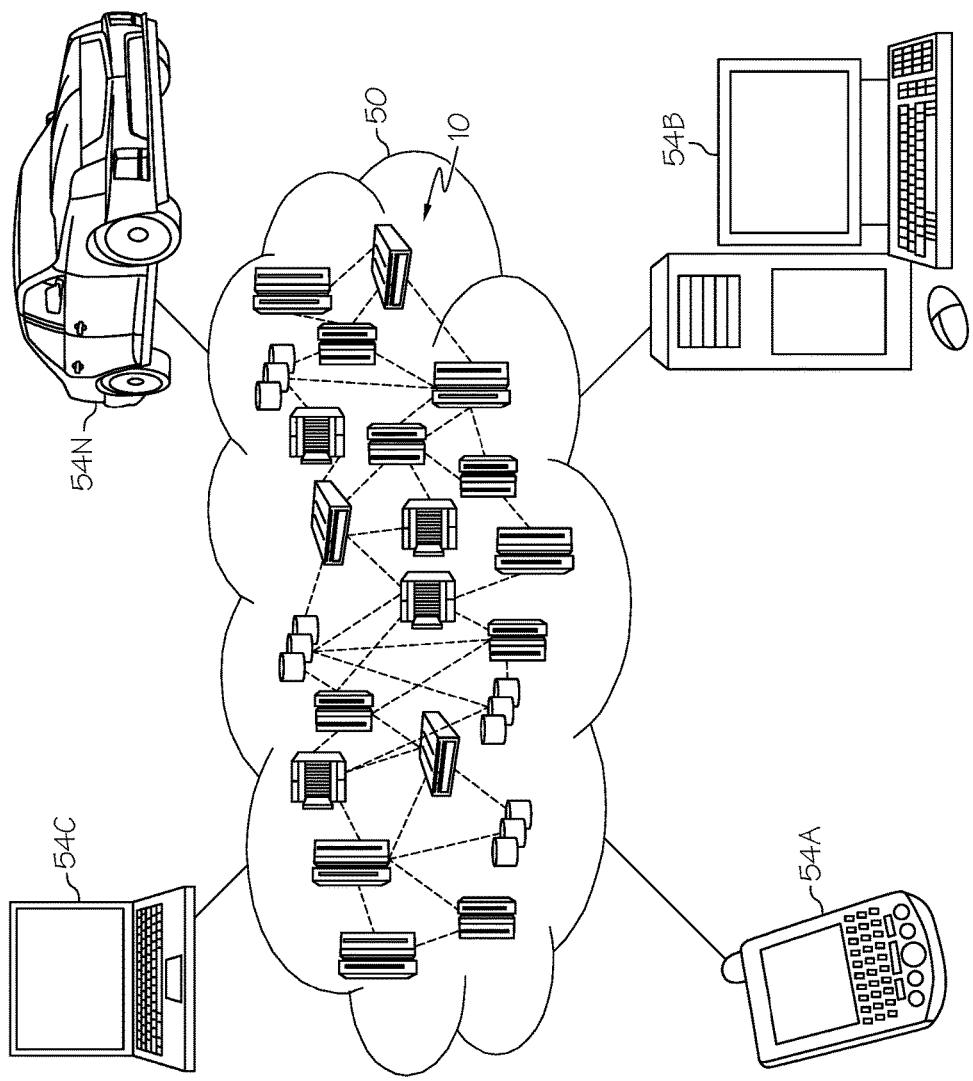
FIG. 2 depicts a cloud computing environment according to illustrative embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
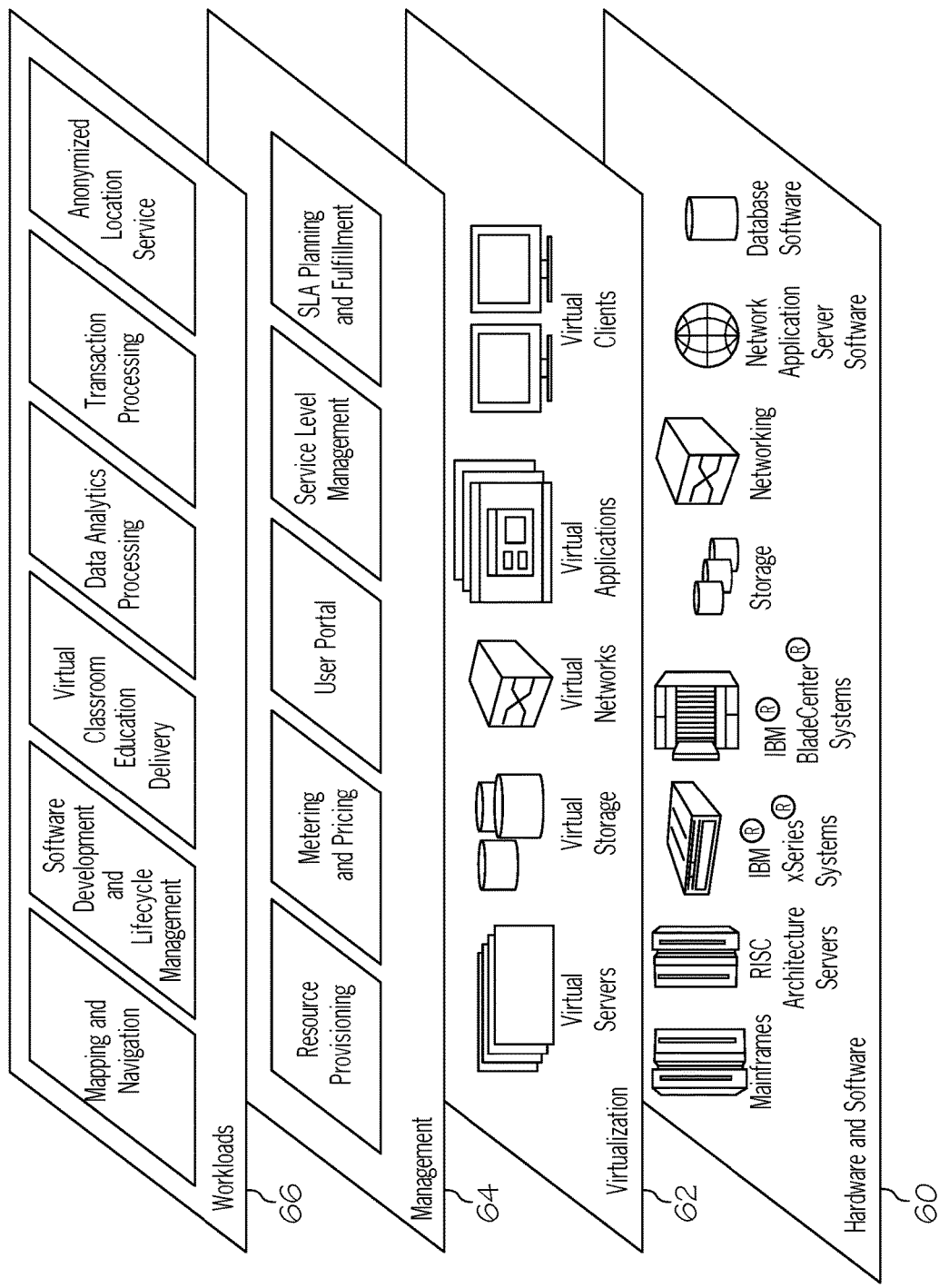
FIG. 3 depicts abstraction model layers according to illustrative embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is communication facilitation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and anonymized location service. As mentioned above, all of the foregoing examples described with respect to FIG. 3 are illustrative only, and the invention is not limited to these examples.

It is understood that all functions of the present invention as described herein typically may be performed by the command identification functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
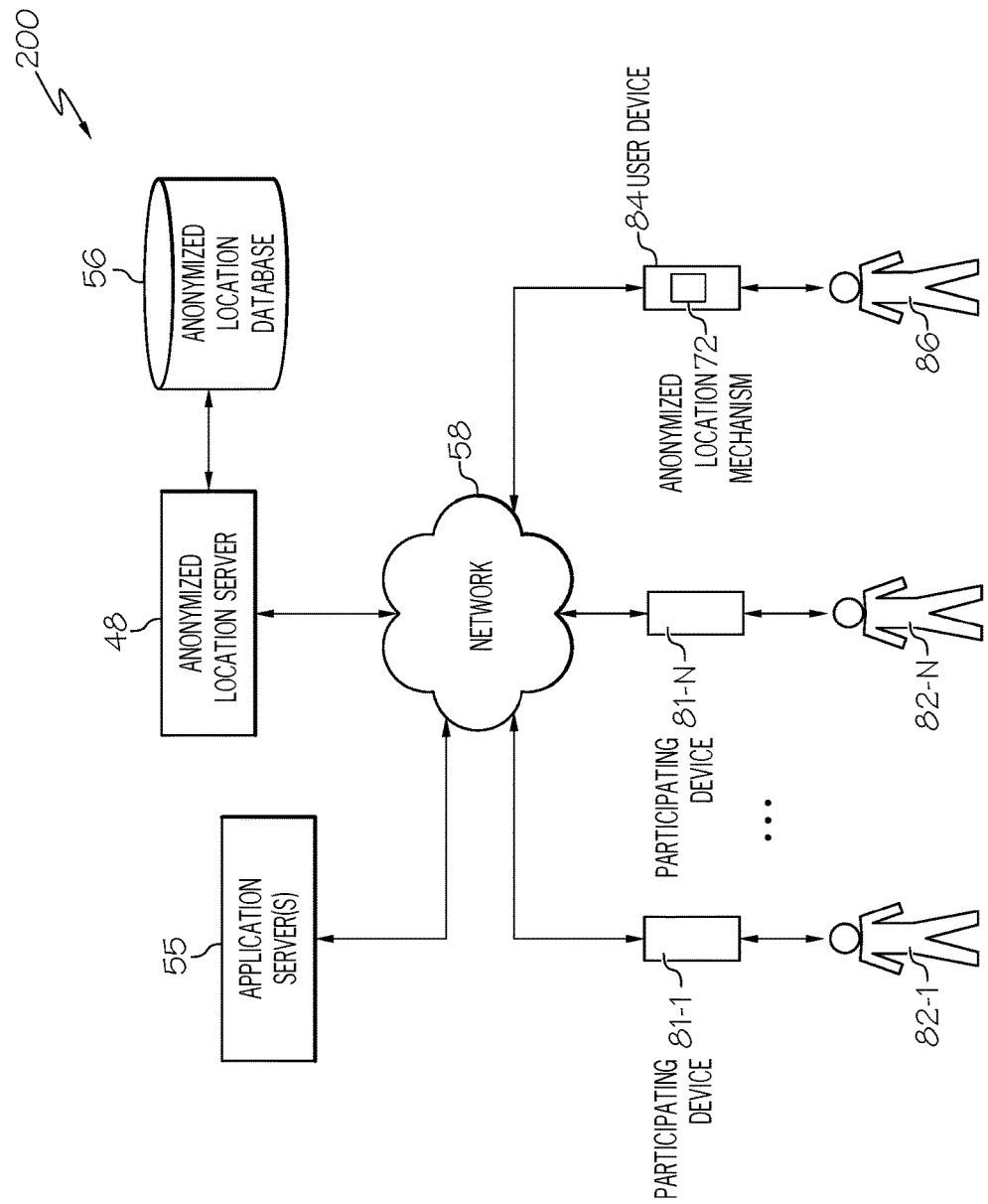
FIG. 4 shows a schematic diagram 200 illustrating an exemplary environment for implementation according to illustrative embodiments.

FIG. 4 shows a schematic diagram 200 illustrating an exemplary environment for implementation according to illustrative embodiments. As shown, system 200 includes an anonymized location server 48, an anonymized location database 56, one or more application server(s) 55, a number of participating devices 81-1 through 81-N (generally referred to herein collectively as participating devices 81 and individually as participating device 81) having associated participating users 82-1 through 82-N (generally referred to herein collectively as participating users 82 and individually as participating user 82), and a user device 84 including anonymized location mechanism 72 having an associated user 86 communicatively coupled via a network 58. The network 58 may be any type of network or any combination of networks. Specifically, the network 58 may include wired components, wireless components, or both wired and wireless components. In one exemplary embodiment, the network 58 is a distributed public network such as the Internet, where the participating devices 81 and user device 84 are enabled to connect to the network 58 via local wireless connections (e.g., Wi-Fi® or IEEE 802.11 connections) or wireless telecommunications connections (e.g., 3G or 4G telecommunications connections such as GSM, LTE, W-CDMA, or WiMAX® connections).

Participating devices 81 and/or user device 84 may be mobile smart phones, portable media player devices, portable fitness devices, mobile gaming devices, or the like. Some exemplary devices that may be programmed or otherwise configured to operate as participating devices 81 and/or user device 84 are the Apple® iPhone®, the Motorola Droid or similar phone running Google's Android™ Operating System, an Apple® Pad™, and the Apple® iPod Touch® device. However, this list of exemplary devices is not exhaustive and is not intended to limit the scope of the present disclosure.

In general, the one or more application servers 55 operate to provide services for a number of persons including participating users 82 of participating devices 81 and user 86 of user device 84. For example, the one or more application servers 55 may be servers providing services including, but not limited to, social networking services, streaming media services, email services, music services, ticketing services, coupon/deal services, cloud storage services, digital calendars, travel services, banking services, health care services, news services, directions services, weather services, gaming services, restaurants, retail stores, theaters, or the like.

In an embodiment, anonymized location server 48 generally operates to obtain/maintain an assigned geographic location for each participating device 81 and user device 84. In an embodiment, each assigned geographic location may represent a residence of the respective user of the device and can be expressed as positional geographic coordinates such as latitude-longitude pairs, and a height vector (if applicable), or any other similar information capable of identifying a given physical point in space in a two-dimensional or three-dimensional coordinate system. In an embodiment, assigned geographic locations associated with each participating device 81 and user device 84 may be stored in anonymized location database 56. In addition, anonymized location database 56 may store an address associated with each participating device 81 and user device 84. For example, the address may include a private IPv4 address which can be translated via Large Scale Network Address Translation (LSN) in order to communicate with the device.

Anonymized location database 56 may be a relational database, which is implemented in a combination of hardware (i.e., physical data storage hardware) and software (i.e., relational database software). Although anonymized location database 56 is shown as separate from anonymized location server 48, anonymized location database 56 may be integral to or separate from anonymized location server 48.

Figure 5:
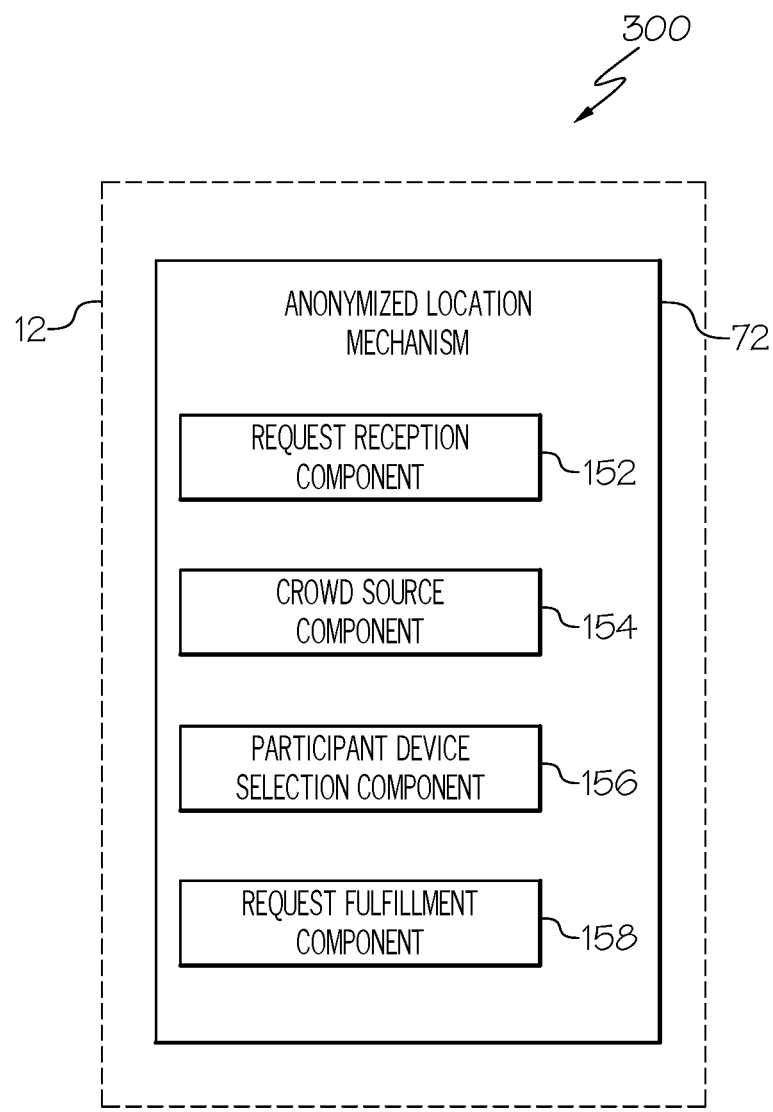
FIG. 5 shows a block diagram 300 illustrating an anonymized location mechanism 72 according to illustrative embodiments.

Referring now to FIG. 5, block diagram 300 describing the functionality discussed herein according to an embodiment of the present invention is shown. It is understood that the teachings recited herein may be practiced within any type of computing environment (e.g., computer system/server 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have an anonymized location mechanism 72 (hereinafter "system 72"). Rather, system 72 could be loaded on a server or server-capable device that communicates (e.g., wirelessly) with the physical server to provide the functions described herein. Regardless, as depicted, system 72 can be implemented as program/utility 40 on computer system/server 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 5 for brevity purposes.

In an embodiment, a user (e.g., participating user 82, user 86) may install anonymized location mechanism 72 on a mobile device from one of several digital distribution platforms for mobile devices, such as the Apple® App Store™ for iOS™ devices, the Android™ Marketplace for Android™ OS devices, and the like. Once the anonymized location mechanism 72 has been downloaded on a mobile device, the user may "opt-in" and utilize an anonymized location service for servicing a location request for the mobile device by providing anonymized location data. Each user who has opted in becomes a participating user. User 86 is a participating user but is designated differently in this disclosure for purposes of clarity. In this disclosure, user 86 represents a participating user taking advantage of the anonymized location service when subject to a location request.

Figure 6:
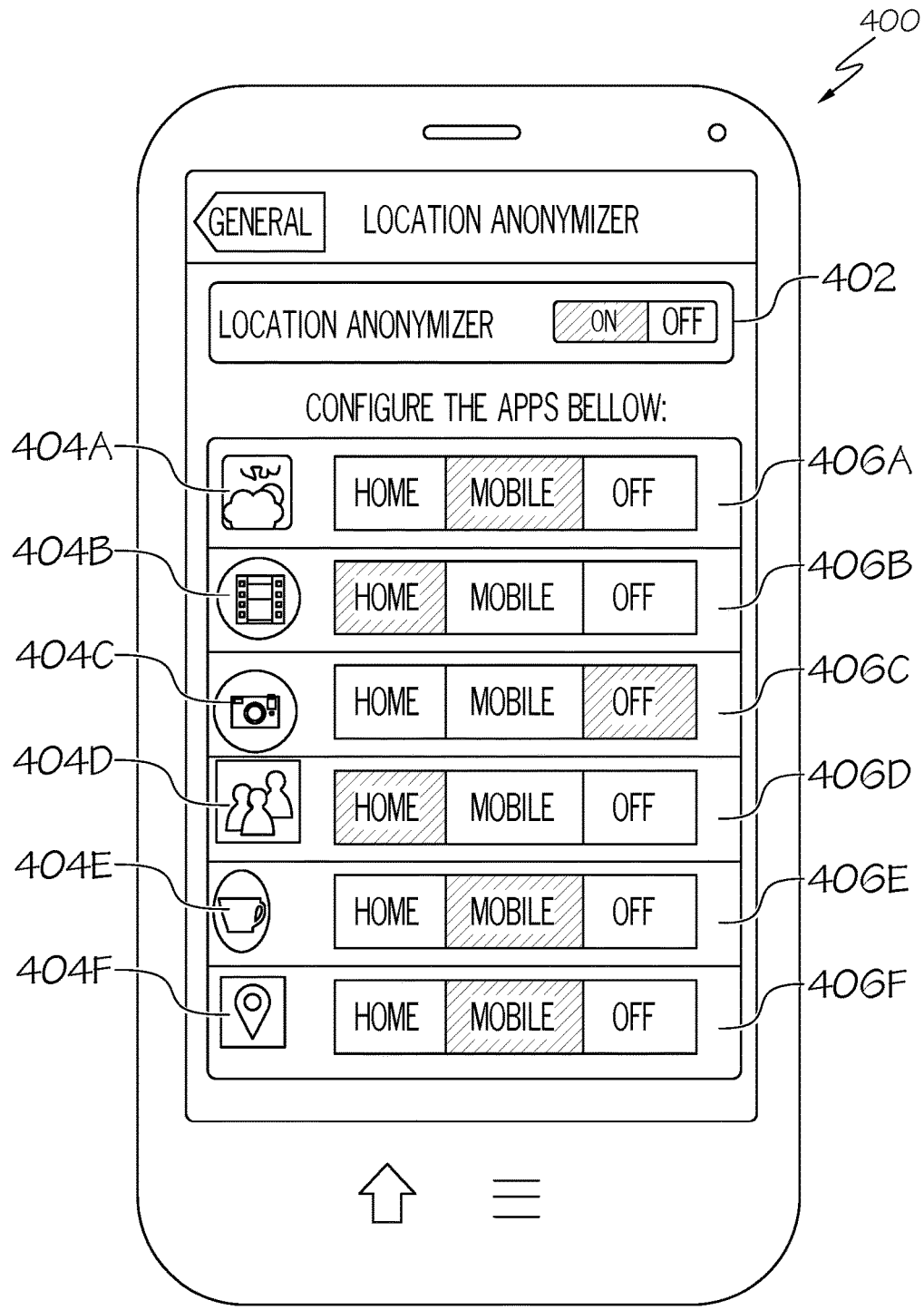
FIG. 6 shows an example graphical user interface 300 according to illustrative embodiments.

FIG. 6 shows an example graphical user interface (GUI) 400 for configuring technical settings related to the anonymized location service on a mobile device. In an embodiment, the user interface can include a menu to access the technical settings. The technical settings can include opting in or out of the anonymized location service. In addition, technical settings can include setting options for location-based and/or location-tracking applications installed on the mobile device when opting in to the anonymized location service. The technical settings above are exemplary only and not intended to be limiting. As shown, GUI 400 includes opt-in button 402 and application setting options 406A-F for installed applications 404A-F, respectively. As shown, opt-in button 402 is set to 'ON' for user device 84. Technical settings will be described in greater detail below. All of the information described above can be presented in a single user interface screen. In some implementations, if the screen is not large enough, an expanded interface (e.g., scrollable, tabbed, multi-paged, etc.) can be presented, and the user can navigate through the screen to review and configure all the necessary settings.

The inventors of the invention described herein have recognized certain deficiencies in known methods for providing location data when using a mobile device. One current solution for users is to disable location services on their mobile device. However, this often prevents the user from using useful services associated with certain applications. Recently, certain mobile devices enable users to turn location services on/off on a per application basis. While this method seems to solve the problem, it still falls short. First, users must manually and continuously check which location-based and/or location-tracking applications are allowed access location data. This can be cumbersome for users and time consuming. Second, users must still trust the location-based and/or location tracking applications with their location data. This can be risky for users. For example, assume that a user leverages an application that provides restaurant reviews in the user's general location. The application may provide a useful location-based service, but the location data may also be transmitted to other companies who use it for unintended or malicious purposes. The approaches described herein provide a seamless way for providing anonymized location data of users through crowd sourcing while still providing access to location-based and/or location-tracking applications.

Referring now to FIGS. 7A-B, example maps 500, 550 are illustrated according to embodiments of the invention. FIGS. 7A-B are used to illustrate the operation of anonymized location mechanism 72 of user device 84. Consider the following example. User 86 lives in Cleveland and is vacationing in the Washington, D.C. area. FIG. 7A shows the Cleveland area including home geographic cell 502. FIG. 7B shows the Washington, D.C. area including mobile geographic cell 552. Geographic cells will be discussed in greater detail below.

Referring back to FIGS. 6 and 7A-B, assume that user 86 has configured technical settings for user device 84 as shown in GUI 400. As shown, opt-in button 402 is set to 'ON' for user device 84 meaning user 86 has opted in to the anonymized location service. In addition, user 86 has configured settings for installed applications 404A-F. As shown, each of application setting options 406A-F include three options: 'Mobile', and 'OFF'. Weather application 404A, coffee shops application 404E, and map application 404F are set to 'Mobile'. Movie application 404B and social media application 404D are set to 'Home'. Camera application 404C is set to 'OFF'. Location services (and any related settings)

native to user device 84 may be utilized when servicing a location request when a user has opted out of the anonymized location service (i.e., opt-in button 402 is set to 'OFF').

In an embodiment, anonymized location data using a home location or a mobile location may be provided in response to a location requested based on the technical settings discussed above (e.g., movie application 404B set to 'Home' and weather application 404A set to 'Mobile'). Assume a home location associated with user device 84 is located near the center of home geographic cell 502. Further, assume a mobile location associated with user device 84 (i.e., the current location of user device 84) is located near the center of mobile geographic cell 550 Home geographic cell 502 includes participating device 81-1 at current location B (shown as a circle 'B' on the map), participating device 81-10 at current location D, and participating device 81-20 at current location F. Participating devices 81-1, 81-10, and 81-20 have a home location within home geographic cell 502. Mobile geographic cell 552 includes participating device 81-3 at current location A (shown as a circle 'A' on the map), participating device 81-13 at current location C, participating device 81-23 at current location E, and participating device 81-33 at current location G. Participating devices 81-3, 81-13, 81-23, and 81-33 have a home location within mobile geographic cell 552.

Referring again to FIGS. 1 and 5, in conjunction with FIGS. 7A-B, request reception component 152 of system 72, as executed by computer system/server 12, is configured to receive a request for a location. In an embodiment, a location request may be initiated from an application server 55 or initiated by a user (e.g., user 86), such as when the user launches a location-based and/or location-tracking application on user device 84. A location request simply requests a current location for a particular mobile device. For example, user 86 launches camera application 404C to take a picture while on vacation in Washington, D.C., and application server 55 associated with camera application 404C requests a location of user device 84. While user 86 has opted in to the anonymized location service (i.e., opt in button 402 set to 'ON'), user 86 has selected 'OFF' at application setting option 406C related to camera application 404C. Therefore, the anonymized location service will not be used with camera application 404C. In an embodiment, location services (and any related settings) native to user device 84 may be utilized (if available) when servicing a location request related to camera application 404C.

Crowd source component 154 of system 72, as executed by computer system/server 12, is configured to generate a geographic cell depending on an application setting option of an application associated with a location request. For example, for a user who has opted in to the anonymized location service, an application setting option of 'Home' or 'Mobile' for an application related to a location request is used to generate a geographic cell based on the application setting option. In other words, a home geographic cell is defined based on a home location of user device 84 when an application setting option is set to 'Home'. A mobile geographic cell is defined based on a current location of user device 84 when an application setting option is set to 'Mobile'.

In an embodiment, a home geographic cell may be a predefined shape and size that is centered at or that otherwise encompasses a user's (e.g., user 86) home location. A home location associated with a mobile device may be manually entered (e.g., manually entering a home address) or derived based on prior location movements associated with the mobile device. For example, if a user (and user's mobile device) is determined to spend a majority of nights at a particular location, it may be assumed that the location is the user's home address. In an example, a home geographic cell may include a circular area having a radius of a predefined distance (e.g., 10 miles). Alternatively or in addition, a home geographic cell may derived, at least in part, by a number of participating users 82 within the home geographic cell. For example, the example home geographic cell above may be expanded (e.g., to 25 miles) in order to include a predefined minimum number of participating users 82 (e.g., at least 20).

Similarly, a mobile geographic cell may be a predefined shape and size that is centered at or that otherwise encompasses a current mobile location associated with a user (e.g., user 86). For example, a mobile geographic cell may include a circular area having a radius of a predefined distance. Alternatively or in addition, a mobile geographic cell may be derived, at least in part, by a number of participating users 82 within the mobile geographic cell. In an embodiment, rules for generating a geographic cell (e.g., size, shape, minimum number of participating users, etc.) may be stored in a rules database (not shown).

Crowd source component 154 of system 72, as executed by computer system/server 12, is further configured to identify a set of available participating devices within a defined geographic cell. In an embodiment, crowd source component 154 obtains assigned geographic locations from anonymized location database 56 to generate a list of participating devices having an assigned geographic location within the geographic cell. Using the list, an availability of each listed participating device within the geographic cell is determined. In an embodiment, a current location of each of the participating devices is used to determine availability. For example, only those participating devices currently within the geographic cell are deemed to be available. In an embodiment, the current locations of the participating devices may be obtained directly from the participating devices (e.g., via pinging or triangulation).

Participant device selection component 156 of system 72, as executed by computer system/server 12, is configured to select a participant device from among the set of available participating devices. In an embodiment, a participant device is randomly selected from the set of available participating devices. In another embodiment, a participant device may be selected based on a set of predefined rules and/or a predefined algorithm. The predefined rules and/or predefined algorithm may be stored in a rules database (not shown).

Request fulfillment component 158 of system 72, as executed by computer system/server 12, is configured to fulfill a location request for a mobile device. In an embodiment, request fulfillment component 158 may receive an address (e.g., from anonymized location database 56) for a selected participant device and route the location request to the address of the selected participating device so that the selected participating device can fulfill the location request by, transmitting a current location of the selected participating device to an application server associated with the location request.

Two examples of the anonymized location service will be described below with respect to FIGS. 5, 6, and 7A-B. In a first example, referring back to FIG. 6, movie application 404B is running in the background on user device 84. Application server 55 associated with movie application 404B sends a request for a location to user device 84 who is vacationing in Washington, D.C. Request reception component 152 receives the location request. As shown in FIG. 6, application setting option 406B for movie application 404B is set to 'Home'. Therefore, crowd source component 154 determines home geographic cell 502 based on a home location (i.e., Cleveland) associated with user device 84.

Crowd source component 154 identifies participating devices having an assigned geographic location within home geographic cell 502 (e.g., participating device 81-1 at location B, participating device 81-10 at location D, and participating device 81-20 at location F). In an embodiment, crowd source component 154 may query anonymized location database 56 to obtain addresses of participating devices having an assigned geographic cell within home geographic cell 502. Based on the availability of the participating devices (e.g., current location), participant device selection component 156 selects a participant device from among the participating devices. Request fulfillment component 158 routes the location request to the selected participating device via an address associated with the participating device so that the participating device can fulfill the location request by transmitting a location of the selected participating device to the application server.

In a second example, referring again to FIG. 6, user 86 launches coffee shops application 404E in order to locate a nearby coffee shop while vacationing in Washington, D.C., which initiates a request for a location of user device 84. The location of the user device 84 may be sent to an application server 55 associated with coffee shops application 404E in order to determine nearby coffee shops. In this example, coffee shops application 404E is launched within a minute of the location request associated with movie application 404B.

Request reception component 152 receives the location request. As shown in FIG. 6, application setting option 406E for coffee shops application 404E is set to 'Mobile'. Therefore, crowd source component 154 determines mobile geographic cell 552 based on a current location (i.e., Washington, D.C.) associated with user device 84. Crowd source component 154 identifies participating users having an assigned geographic location within mobile geographic cell 552 (e.g., participating device 81-3 at location A, participating device 81-13 at location C, participating device 81-23 at location E, and participating device 81-33 at location G). Based on the availability of the participating devices (e.g., current location), participant device selection component 156 selects a participant device from among the participating devices. Request fulfillment component 158 routes the location request to the selected participating device via an address associated with the participating device so that participating device can fulfill the location request.

Referring back to the two examples, assume participating device 81-1 (at Location B) is selected from among the set of available participating devices in the first example. The location request associated with movie application 404B is received by user device 84, but is fulfilled by participating device 81-1 making it appear user device 84 is currently located at Location B. Less than a minute later, user 86 launches coffee shops application 404E which initiates a second request for a location of user device 84. Participating device 81-33 (at Location G) is selected from the set of available participating devices in the second example. The second location request is fulfilled by participating device 81-33 making it appear user device 84 is currently located at Location G making it difficult, if not impossible, for anyone to detect the actual current location of user 86. Within seconds, it appears user 86 is in the Cleveland area (i.e., Location B) and then the Washington, D.C. area (i.e., Location G).

In another embodiment, participant device selection component 156 may select multiple participant devices from among the set of available participating devices and request fulfillment component 158 may transmit the location request to each of the selected participant devices to satisfy the location request. Using coffee shops application 404E as an example, a list of coffee shops based on the locations of the selected participating devices may be displayed on user device 84.

Figure 8:
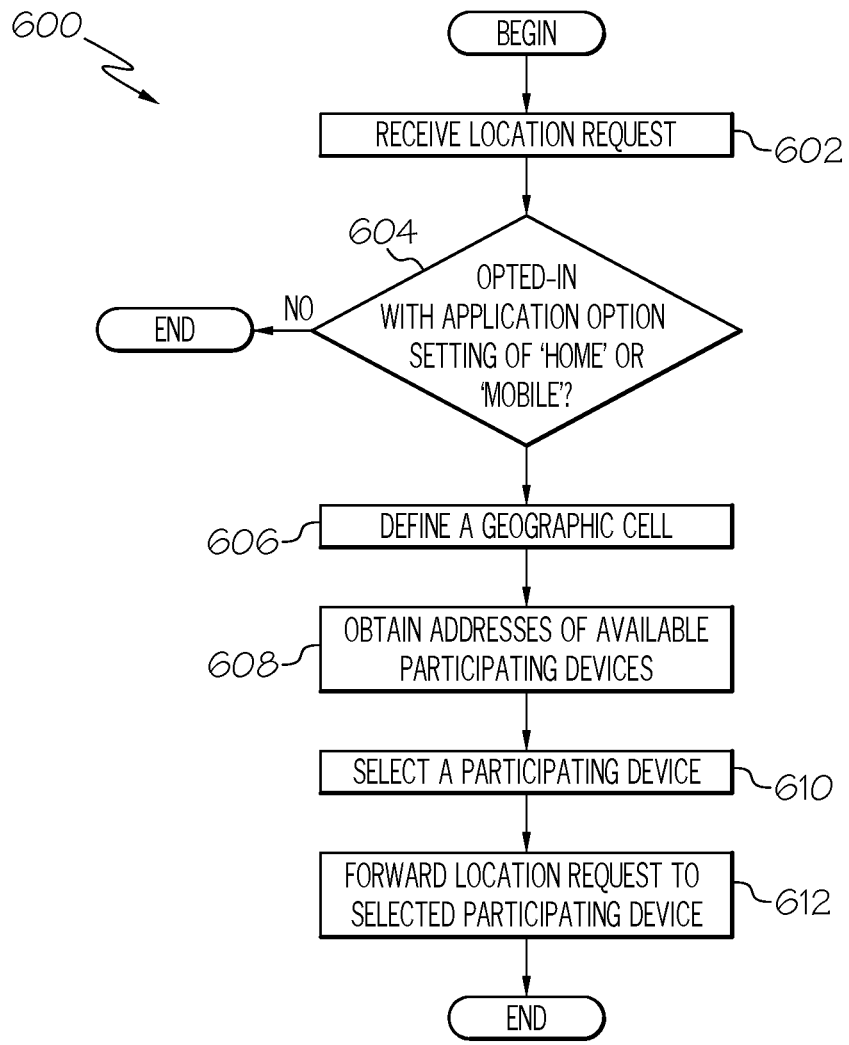
FIG. 8 shows a process flowchart 600 for servicing a location request for a user device by providing anonymized location data according to illustrative embodiments.

Referring now to FIG. 8, in conjunction with FIGS. 1-5, an implementation of a process flowchart 600 for servicing a location request for a user device by providing anonymized location data is shown. At step 602, request reception component 152 receives a location request associated with a location-based/location-tracking application at a mobile device of a user. At step 604, a determination is made whether the user has opted in to the anonymized location service. If so, a determination is made whether an application setting option associated with the location-based/location-tracking application is set to 'Home' or 'Mobile'. If so, at step 606, crowd source component 154 defines a geographic cell based on the application setting option.

At step 608, crowd source component 154 determines a set of available participating devices having an assigned geographic location within the geographic cell and obtains an address for each available participating device. In an embodiment, the addresses may be obtained from anonymized location database 56. At step 610, participant device selection component 156 selected a participating device from among the set of available participating devices. At step 612, request fulfillment component 158 transmits the location request to the selected participating device via an address of the device so that the selected participating device can fulfill the location request.

Process flowchart 600 of FIG. 8 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for servicing a location request for a user device by providing anonymized location data. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for servicing a location request for a user device by providing anonymized location data. In this case, the service provider can create, maintain, support, etc., a computer infrastructure that performs the process steps of the invention for one or more consumers. In return, the service provider can receive payment from the consumer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches for servicing a location request for a user device by providing anonymized location data. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for providing location information, the method comprising:
   receiving, by a user device from an application server, a request for a location of the user device;
   defining a geographic cell having a physical area based on a designated location corresponding to an application option setting selected for an application associated with the application server;
   identifying a set of available participating mobile devices to which the request for the location can be redirected that are currently physically located within the geographic cell;
   selecting a participating mobile device from among the set of available participating mobile devices; and
   routing the location request to the selected participating mobile device via an address associated with the selected participating mobile device.

2. The computer-implemented method of claim 1, further comprising transmitting, from the selected participating mobile device, a location associated with the selected participating mobile device to the application server.

3. The computer-implemented method of claim 1, wherein the user device and each participating mobile device of the set of participating mobile devices are each selected from a group consisting of: mobile smart phones, portable media player devices, portable fitness devices, and mobile gaming devices.

4. The computer-implemented method of claim 1, wherein the application option setting includes a home option and a mobile option, and wherein the application option setting is set via a graphical user interface on the user device.

5. The computer-implemented method of claim 4, further comprising:
   defining the geographic cell based on a home location of the user device when the home option is selected and defining the geographic cell based on a current location of the user device when the mobile option is selected; and
   redefining, in response to a determination that a number of available participating mobile devices within the geographic cell is less than a minimum threshold, the geographic cell to expand the physical area.

6. The computer-implemented method of claim 1, further comprising:
   defining a second geographic cell having a different physical area based on a second designated location corresponding to a second application option setting selected for a second application associated with a second application server;
   identifying, in response to a second request for the location of the user device, a second set of available participating mobile devices that are currently physically located within the second geographic cell;

selecting a second participating mobile device from among the second set of available participating mobile devices; and routing the second location request to the selected second participating mobile device via an address associated with the selected second participating mobile device.

7. The computer-implemented method of claim 1, further comprising obtaining an address for each of the set of available participating mobile devices.

8. A computer program product for providing location information embodied in a computer readable storage device which, when executed by at least one computer device, causes the at least one computer device to:

receive, by a user device from an application server, a request for a location of the user device;

define a geographic cell having a physical area based on a designated location corresponding to an application option setting selected for an application associated with the application server;

identify a set of available participating mobile devices to which the request for the location can be redirected that are currently physically located within the geographic cell;

select a participating mobile device from among the set of available participating mobile devices; and route the location request to the selected participating mobile device via an address associated with the selected participating mobile device.

9. The computer program product of claim 8, wherein the set of available participating mobile devices is selected based on an assigned geographic location and current location of each of the available participating mobile devices.

10. The computer program product of claim 8, wherein the user device and participating mobile devices are selected from a group consisting of: mobile smart phones, portable media player devices, portable fitness devices, and mobile gaming devices.

11. The computer program product of claim 8, further comprising program instructions to display a graphical user interface on the user device, wherein the application setting option is set via the graphical user interface, and wherein the application option setting includes a home option and a mobile option.

12. The computer program product of claim 11, further comprising program instructions to:

define the geographic cell based on a home location of the user device when the home option is selected and define the geographic cell based on a current location of the user device when the mobile option is selected; and redefine, in response to a determination that a number of available participating mobile devices within the geographic cell is less than a minimum threshold, the geographic cell to expand the physical area.

13. The computer program product of claim 8, further comprising program instructions to:

define a second geographic cell having a different physical area based on a second designated location corresponding to a second application option setting selected for a second application associated with a second application server;

identify, in response to a second request for the location of the user device, a second set of available participating mobile devices that are currently physically located within the second geographic cell;

select a second participating mobile device from among the second set of available participating mobile devices; and route the second location request to the selected second participating mobile device via an address associated with the selected second participating mobile device.

14. The computer program product of claim 8, further comprising program instructions to obtain an address for each of the set of available participating mobile devices.

15. A computer system for providing location information, the computer system comprising:

a memory medium comprising program instructions;

a bus coupled to the memory medium; and a processor for executing the program instructions, the instructions causing the system to:

receive, by a user device from an application server, a request for a location of user device;

define a geographic cell having a physical area based on a designated location corresponding to an application option setting selected for an application associated with the application server;

identify a set of available participating mobile devices to which the request for the location can be redirected that are currently physically located within the geographic cell;

select a participating mobile device from among the set of available participating mobile devices; and route the location request to the selected participating mobile device via an address associated with the selected participating mobile device.

16. The computer system of claim 15, wherein the user device and participating mobile devices are selected from a group consisting of: mobile smart phones, portable media player devices, portable fitness devices, and mobile gaming devices.

17. The computer system of claim 15, further comprising program instructions to display a graphical user interface on the user device, wherein the application setting option is set via the graphical user interface, and wherein the application option setting includes a home option and a mobile option.

18. The computer system of claim 17, further comprising program instructions to:

define the geographic cell based on a home location of the user device when the home option is selected and define the geographic cell based on a current location of the user device when the mobile option is selected; and redefine, in response to a determination that a number of available participating mobile devices within the geographic cell is less than a minimum threshold, the geographic cell to expand the physical area.

19. The computer system of claim 17, further comprising program instructions to:

define a second geographic cell having a different physical area based on a second designated location corresponding to a second application option setting selected for a second application associated with a second application server;

identify, in response to a second request for the location of the user device, a second set of available participating mobile devices that are currently physically located within the second geographic cell;

select a second participating mobile device from among the second set of available participating mobile devices; and route the second location request to the selected second participating mobile device via an address associated with the selected second participating mobile device.

20. The computer system of claim 15, further comprising program instructions to obtain an address for each of the set of available participating mobile devices.

\* \* \* \* \*